US012783013B2

(12) United States Patent
Fernandez Orellana et al.

(10) Patent No.: US 12,783,013 B2
(45) Date of Patent: Nov. 3, 2026

(54) DISPLAY UNIT WITH A ROLLABLE DISPLAY

(71) Applicant: Dell Products L.P., Round Rock, TX (US)

(72) Inventors: Pedro Fernandez Orellana, Queensland (AU); Christopher A. Torres, San Marcos, TX (US); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 19/042,087

(22) Filed: Jan. 31, 2025

(65) Prior Publication Data

US 2026/0227826 A1 Aug. 6, 2026

(51) Int. Cl.
*G06F 1/16* (2006.01)

(52) U.S. Cl.
CPC .......... *G06F 1/1652* (2013.01); *G06F 1/1616* (2013.01)

(58) Field of Classification Search
CPC ..... G06F 1/1652; G06F 1/1624; G06F 1/1616
See application file for complete search history.

(56) References Cited

U.S. PATENT DOCUMENTS

| | | | | |
|---|---|---|---|---|
| 12,238,880 | B2 * | 2/2025 | Yen | H04M 1/0237 |
| 2013/0058063 | A1 * | 3/2013 | O'Brien | G06F 1/1624 361/807 |
| 2021/0223820 | A1 * | 7/2021 | Yoo | H04M 1/0235 |
| 2021/0405696 | A1 * | 12/2021 | Ahn | G06F 1/1624 |
| 2022/0418123 | A1 * | 12/2022 | Liu | G01D 5/145 |
| 2022/0418125 | A1 * | 12/2022 | Li | H05K 5/0017 |

OTHER PUBLICATIONS

Flexible OLEDs (FOLEDs), url access: https://oled.com/oleds/flexible-oleds-foleds/, viewed on Apr. 30, 2025; 3 pages.
Mouse movement, url access: https://learn.microsoft.com/en-US/windows/win32/learnwin32/mouse-movement, published Feb. 2, 2023; 6 pages.

* cited by examiner

*Primary Examiner* — Sagar Shrestha
(74) *Attorney, Agent, or Firm* — McDermott Will & Schulte LLP

(57) ABSTRACT

A display unit, including a display panel including a static portion and a retractable portion; a tension bar coupled to the retractable portion of the display panel; a midframe coupled to the static portion of the display panel; a sync plate including curved slots extending from a first side to a second side of the sync plate, each of the curved slots including a respective first end and a respective second end, the sync plate moveably coupled to the midframe; counterweight springs each including a first end and a second end, the second ends each including a protrusion, the counterweight springs coupled between the midframe and the sync plate such that the protrusions of the second ends of each of the counterweight springs are movably coupled within a respective curved slot of the sync plate; torsion springs coupled between the tension bar and the second side of the sync plate.

20 Claims, 23 Drawing Sheets

DISPLAY UNIT WITH A ROLLABLE DISPLAY

BACKGROUND

Field of the Disclosure

The disclosure relates generally to an information handling system, and in particular, a display unit with a rollable display for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Foldable displays are flexible electronic screens that can be rolled up like a scroll, offering a unique form factor for various devices. They are primarily made using OLED technology, which allows for high-resolution and vibrant displays that can bend without breaking. These displays promise to revolutionize the way we interact with technology, making devices more portable and versatile.

SUMMARY

Innovative aspects of the subject matter described in this specification may be embodied in a display unit, including a display panel including a static portion and a retractable portion; a tension bar coupled to the retractable portion of the display panel; a midframe coupled to the static portion of the display panel; a sync plate including a plurality of curved slots extending from a first side of the sync plate to a second side of the sync plate, each of the curved slots including a respective first end and a respective second end, the sync plate moveably coupled to the midframe; counterweight springs each including a first end and a second end, the second ends each including a protrusion, the counterweight springs coupled between the midframe and the sync plate such that the protrusions of the second ends of each of the counterweight springs are movably coupled within a respective curved slot of the sync plate; torsion springs coupled between the tension bar and the second side of the sync plate; an inner cover coupled to the midframe; an outer cover coupled to the midframe; and a roller coupled to the sync plate and rotatably coupled between the first and the second sides of the outer cover at a first end of the outer cover, wherein when the display panel is in a first state, i) the torsion springs are in an unflexed state to place the tension bar proximate to a second end of the display unit and ii) the protrusions of the counterweight springs are at respective first ends of the curved slots such that the display panel is rolled over the roller and the retractable portion of the display panel is positioned between the static portion of the display panel and the inner cover to hide the retractable portion of the display unit within the display unit, wherein when the display panel is in a second state, i) the torsion springs are in a flexed state to place the tension bar proximate to a first end of the display unit opposite the second end of the display unit and ii) the protrusions of the counterweight springs are at respective second ends of the curved slots such that the display panel is rolled up from the roller and the retractable portion of the display panel is exposed.

Other embodiments of these aspects include corresponding systems and apparatus.

These and other embodiments may each optionally include one or more of the following features. For instance, the midframe includes a first side and a second side, the midframe including a railing system positioned at the first and the second sides of the midframe. The outer cover includes a first side and a second side, the outer cover including moving rails positioned at the first and the second sides of the outer frame. The moving rails of the outer cover are moveably coupled to the railing system of the midframe. The railing system of the midframe includes coil rails at each of the first and the second sides of the midframe, the coil rails including respective coils. The moving rails of the outer cover at each side of the outer cover include a respective magnetic assembly in electromagnetic communication with the respective coils of the coil rails of the railing system of the midframe. Further including a power source to provide a current to the respective coils of the coil rails of the railing system of the midframe to transition the display panel between the first state and the second state. When the display panel is in a third state, i) the torsion springs are in a partially flexed state to place the tension bar between the first end and the second end of the display unit and ii) the protrusions of the counterweight springs are between the first ends and the second ends of the curved slots such that the display panel is partially rolled up from the roller and the retractable portion of the display panel is partially exposed. A force of the counterweight springs counterbalance a weight of the display unit. The static portion of the display panel is always exposed. The midframe is static. The inner cover is static.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
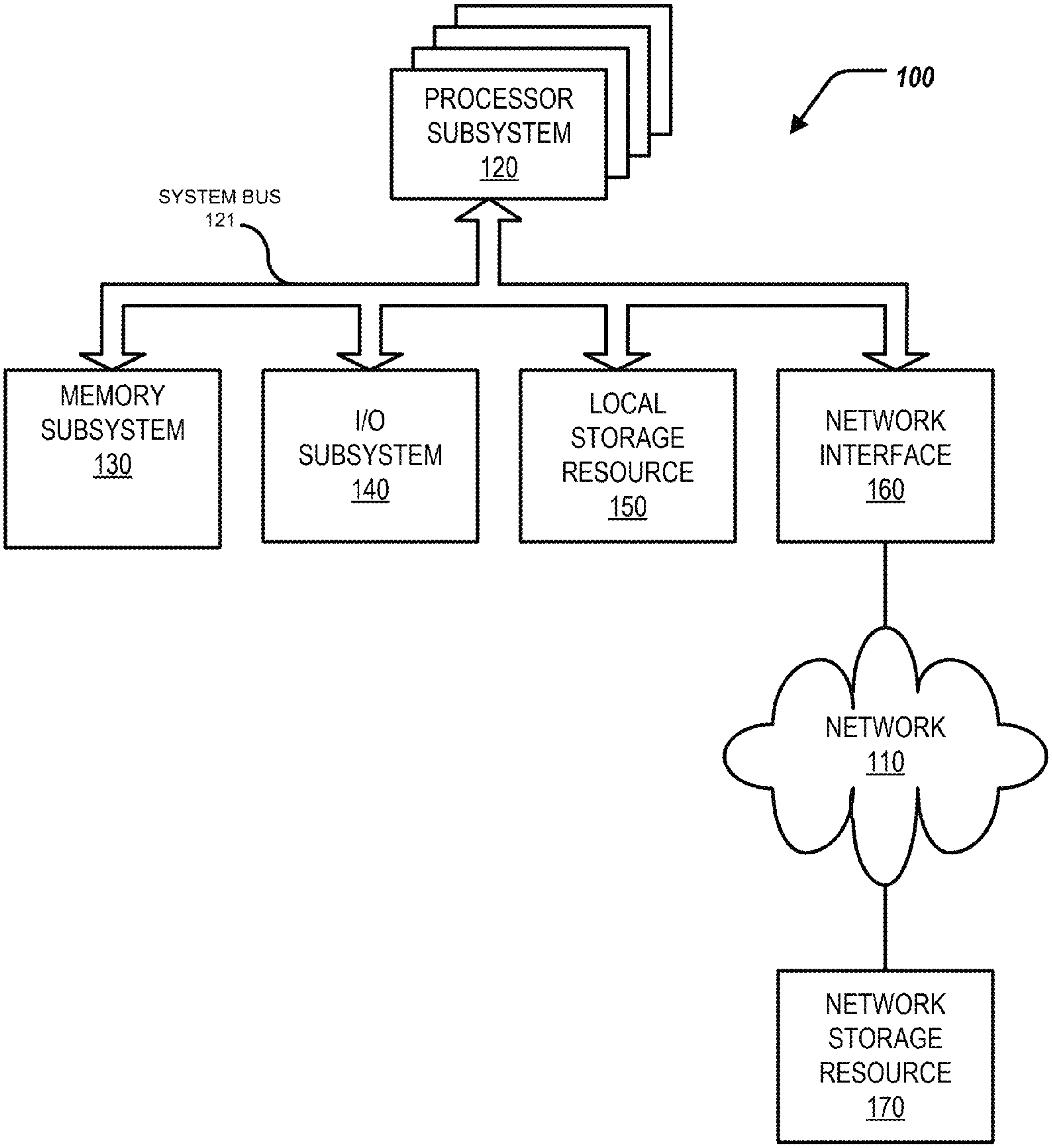
FIG. 1 is a block diagram of selected elements of an embodiment of an information handling system.

This disclosure discusses a display unit with a rollable display for an information handling system. Specifically, this disclosure discusses a display unit including a display panel including a static portion and a retractable portion; a tension bar coupled to the retractable portion of the display panel; a midframe coupled to the static portion of the display panel; a sync plate including a plurality of curved slots extending from a first side of the sync plate to a second side of the sync plate, each of the curved slots including a respective first end and a respective second end, the sync plate moveably coupled to the midframe; counterweight springs each including a first end and a second end, the second ends each including a protrusion, the counterweight springs coupled between the midframe and the sync plate such that the protrusions of the second ends of each of the counterweight springs are movably coupled within a respective curved slot of the sync plate; torsion springs coupled between the tension bar and the second side of the sync plate; an inner cover coupled to the midframe; an outer cover coupled to the midframe; a roller coupled to the sync plate and rotatably coupled between the first and the second sides of the outer cover at a first end of the outer cover, wherein when the display panel is in a first state, i) the torsion springs are in an unflexed state to place the tension bar proximate to a second end of the display unit and ii) the protrusions of the counterweight springs are at respective first ends of the curved slots such that the display panel is rolled over the roller and the retractable portion of the display panel is positioned between the static portion of the display panel and the inner cover to hide the retractable portion of the display unit within the display unit, wherein when the display panel is in a second state, i) the torsion springs are in a flexed state to place the tension bar proximate to a first end of the display unit opposite the second end of the display unit and ii) the protrusions of the counterweight springs are at respective second ends of the curved slots such that the display panel is rolled up from the roller and the retractable portion of the display panel is exposed.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-12 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
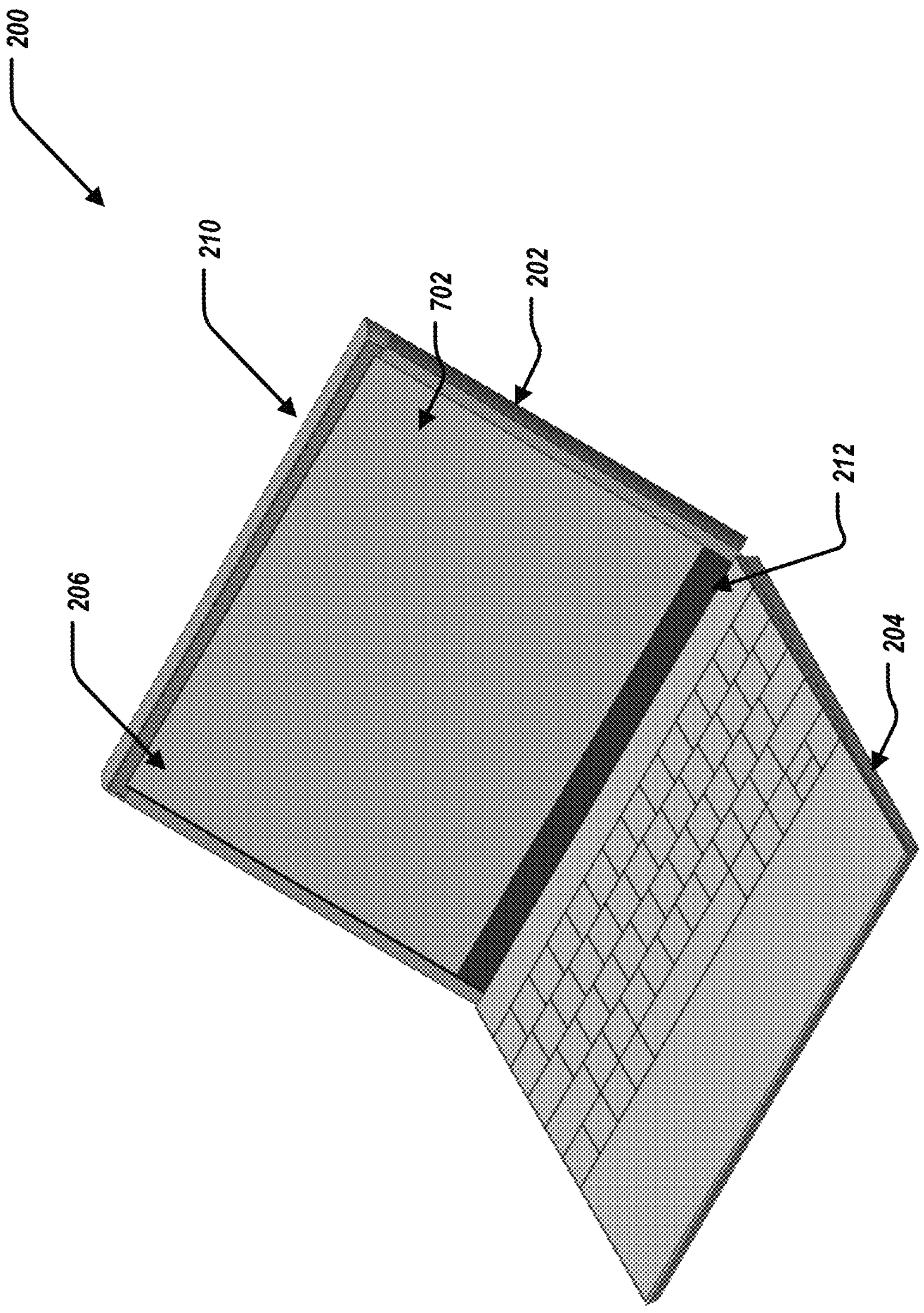
FIG. 2 illustrates a perspective view of the information handling system, in a first state.

Turning to FIG. 2, FIG. 2 illustrates an information handling system 200. In some examples, the information handling system 200 is similar to, or includes, the information handling system 100 of FIG. 1.

FIG. 2 illustrates a perspective view of the information handling system 200, in an open state. The information handling system 200 can include a first body 202 and a second body 204. The first body 202 can include a display unit 206. The display unit 206 can include a first end 210 and a second end 212.

Figure 3:
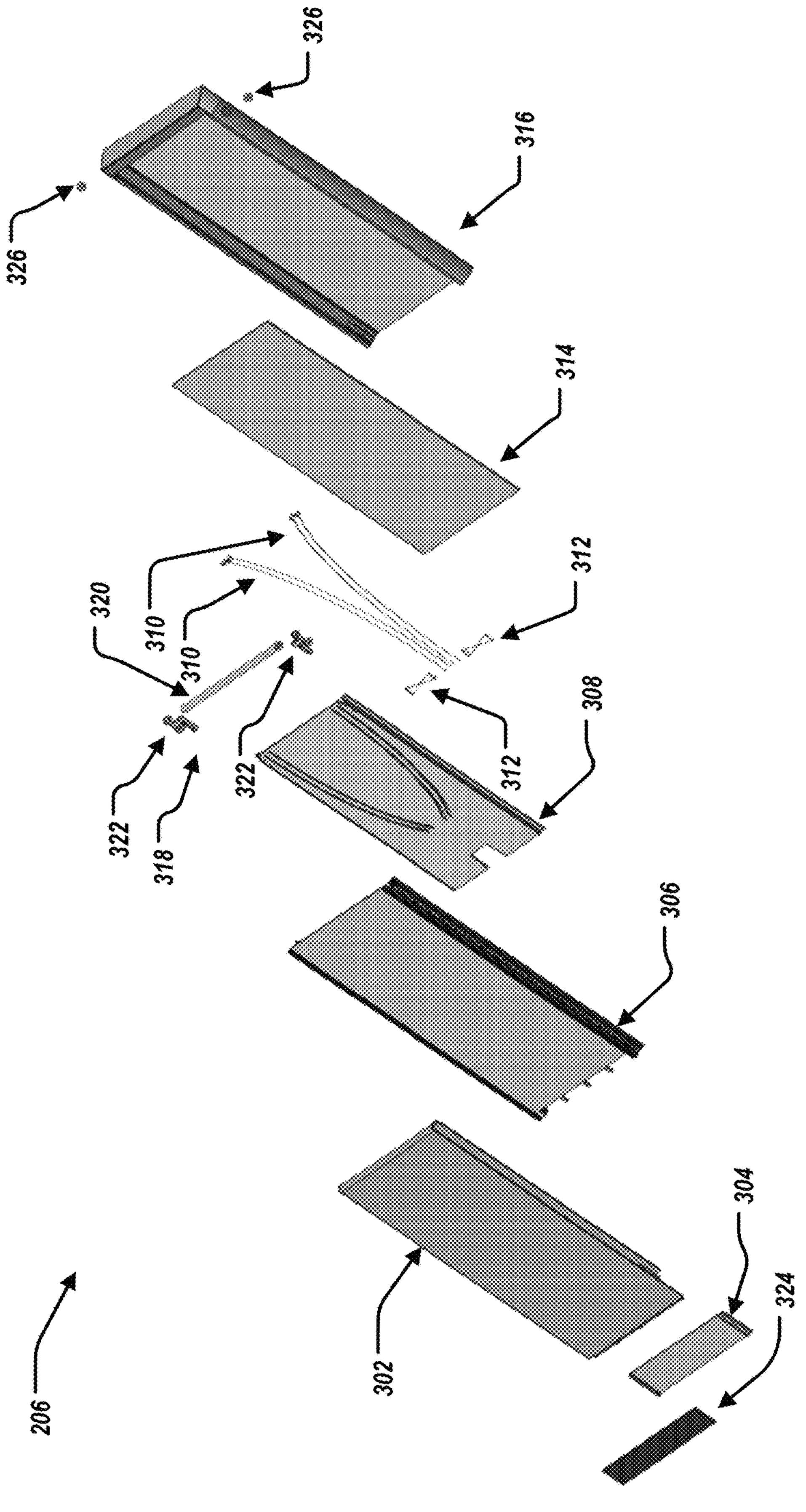
FIG. 3 illustrates an exploded view of a display unit of the information handling system.

FIG. 3 illustrates an exploded view of the display unit 206. The display unit 206 includes a display panel 302, a tension bar 304, a midframe 306, a sync plate 308, counterweight springs 310, torsion springs 312, an inner cover 314, an outer cover 316, and a roller assembly 318. The roller assembly 318 can include a roller 320 and brackets 322. The display unit 206 can further include a bottom bezel 324 and screws 326. In some examples, the display panel 302 is an organic light emitting diode (OLED) display.

Figure 4:
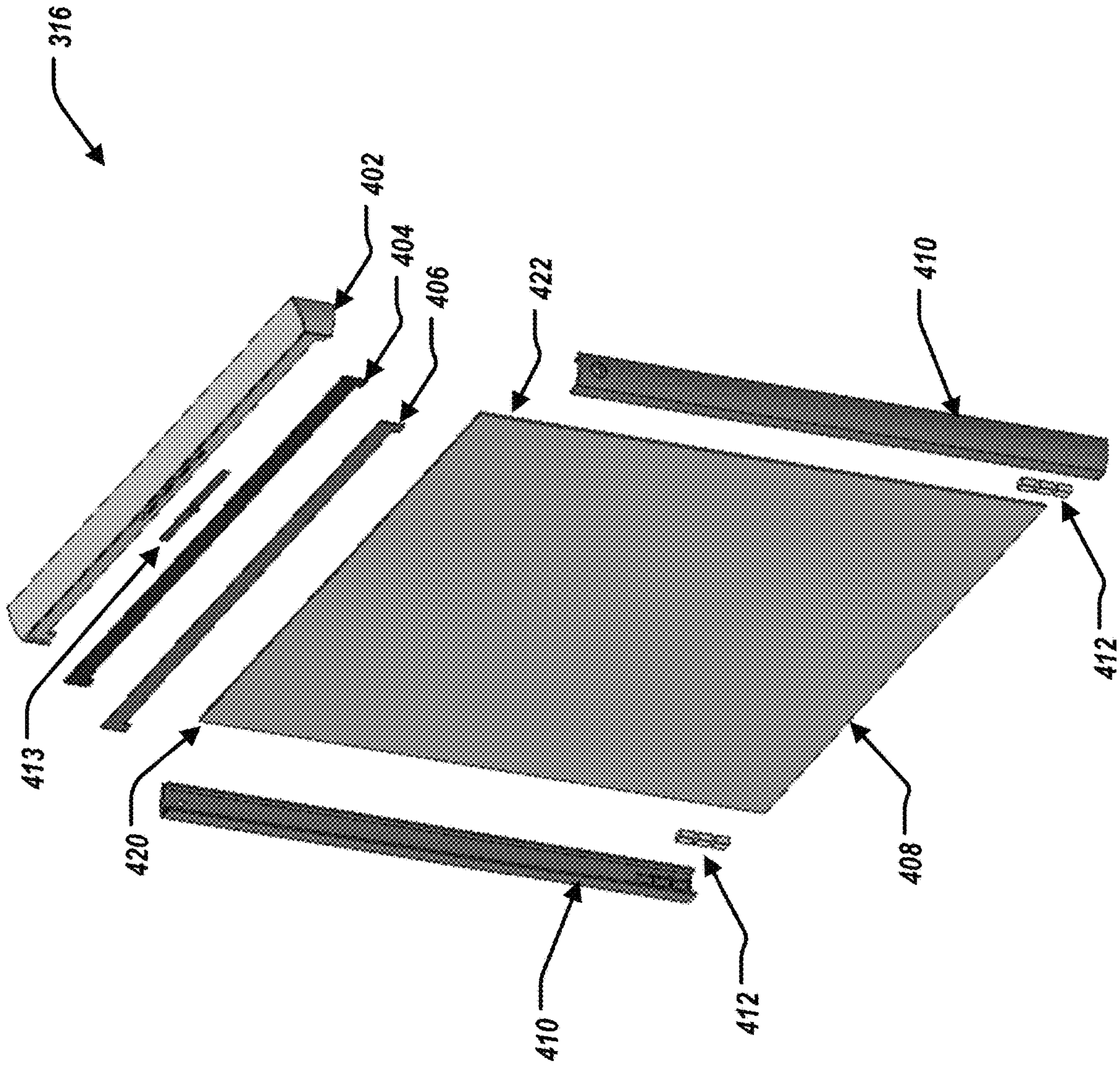
FIG. 4 illustrates an exploded view of an outer cover of the display unit.

FIG. 4 illustrates an exploded view of the outer cover 316. The outer cover 316 can include a top bezel 402, a roller endcap 404, a bezel 406, a rear cover 408, moving rails 410, magnetic assemblies 412, and a camera module 413. The outer cover 316 includes a first side 420 and a second side 422. The moving rails 410 can be positioned at the first side 420 and the second side 422 of the outer cover 316.

Figure 5:
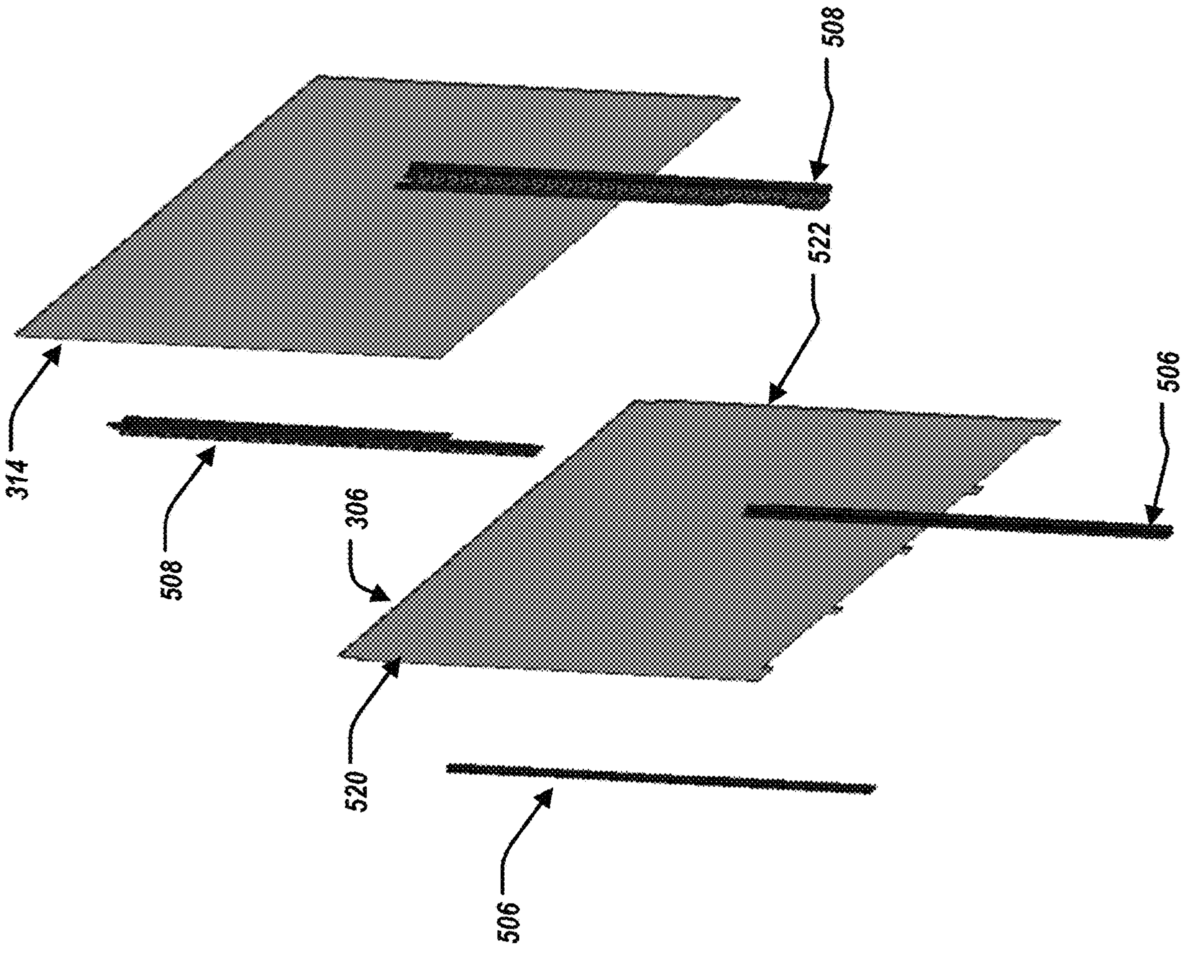
FIG. 5 illustrates an exploded view of a midframe and an inner cover of the display unit.

FIG. 5 illustrates an exploded view of the midframe 306 and the inner cover 314. The midframe 306 includes a bushing rail 506 and a coil assembly 508 (forming a railing system 504 shown in FIG. 6). The midframe 306 includes a first side 520 and a second side 522. The railing system 504 can be positioned at the first side 520 and the second side 522 of the midframe 306.

Figure 6:
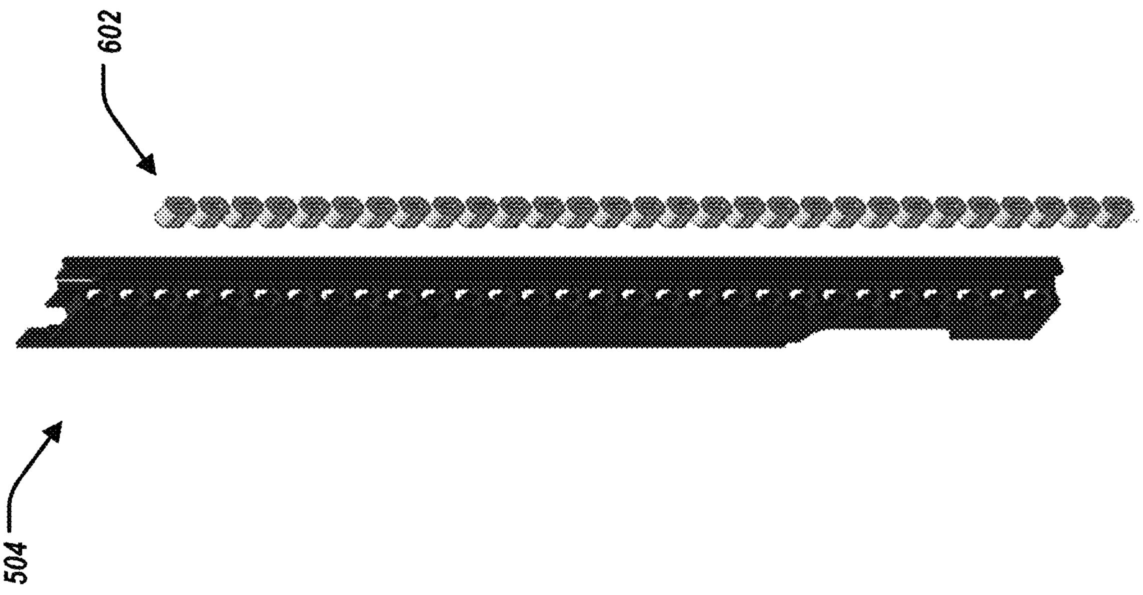
FIG. 6 illustrates a railing system of the midframe of the display unit.

FIG. 6 illustrates the railing system 504. The railing system 504 can further include coil rails 602. The coil rails 602 include coils.

Figure 7A:
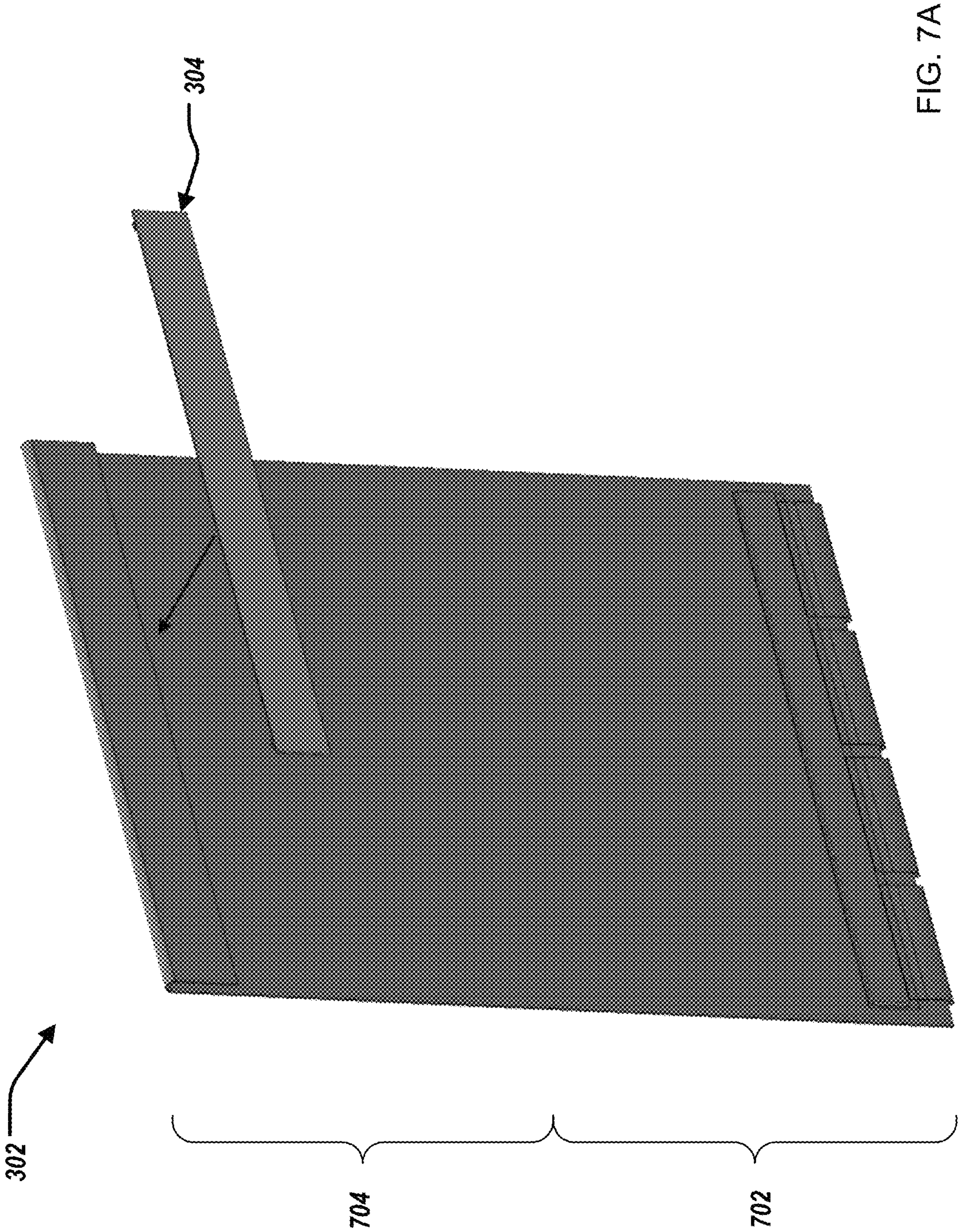
FIGS. 7A-7K illustrate the display unit in various stages of assembly to illustrate the coupling between the components of the display unit.

FIGS. 7A-7K illustrate the display unit 206 in various stages of assembly to illustrate the coupling between the components of the display unit 206. Referring to FIG. 7A, the display panel 302 includes a static portion 702 and a retractable portion 704. The tension bar 304 is coupled to the retractable portion 704 of the display panel 302. The tension bar 304 provides uniform (or substantially uniform) tension on the display panel 302 through the rolling/unrolling process, as described further herein.

Figure 7B:
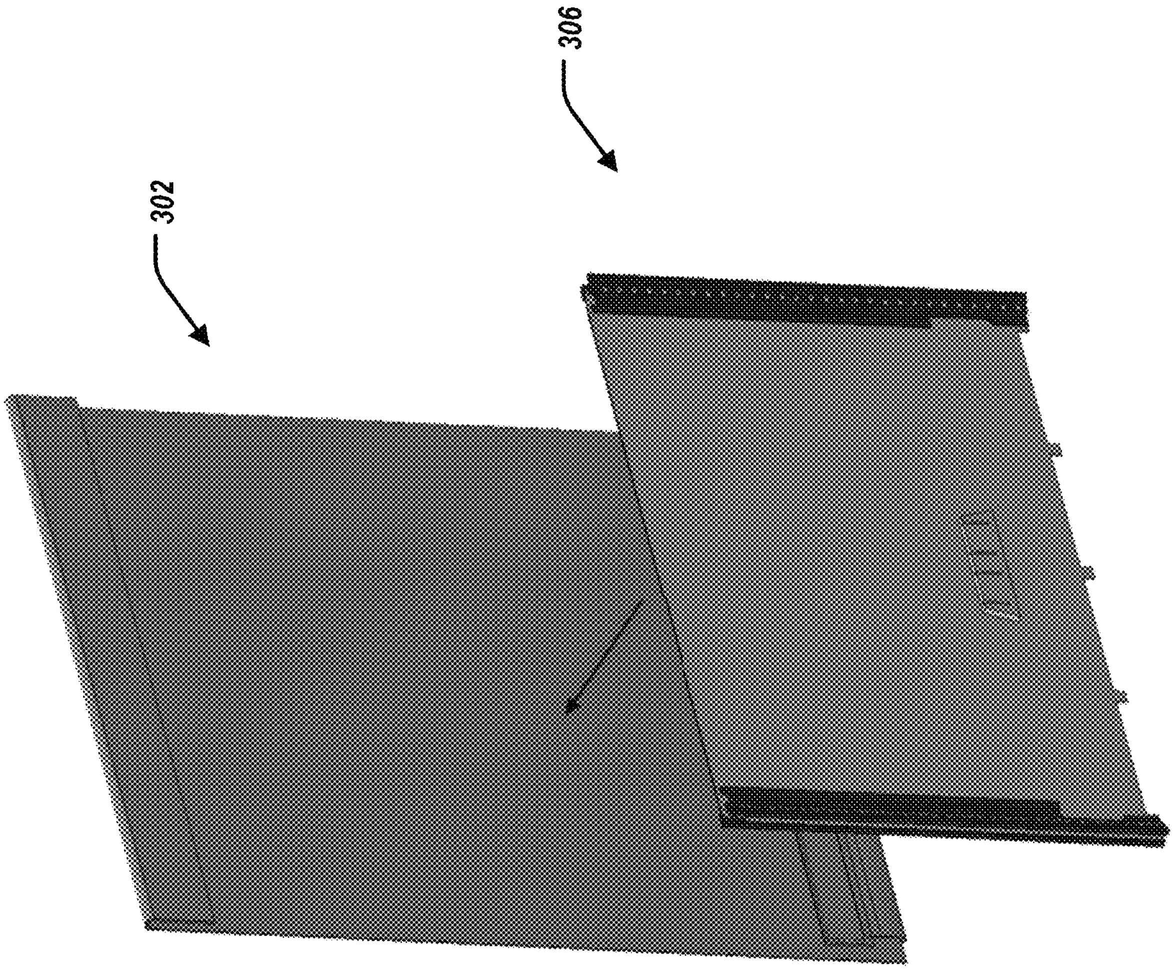
Figure 7C:
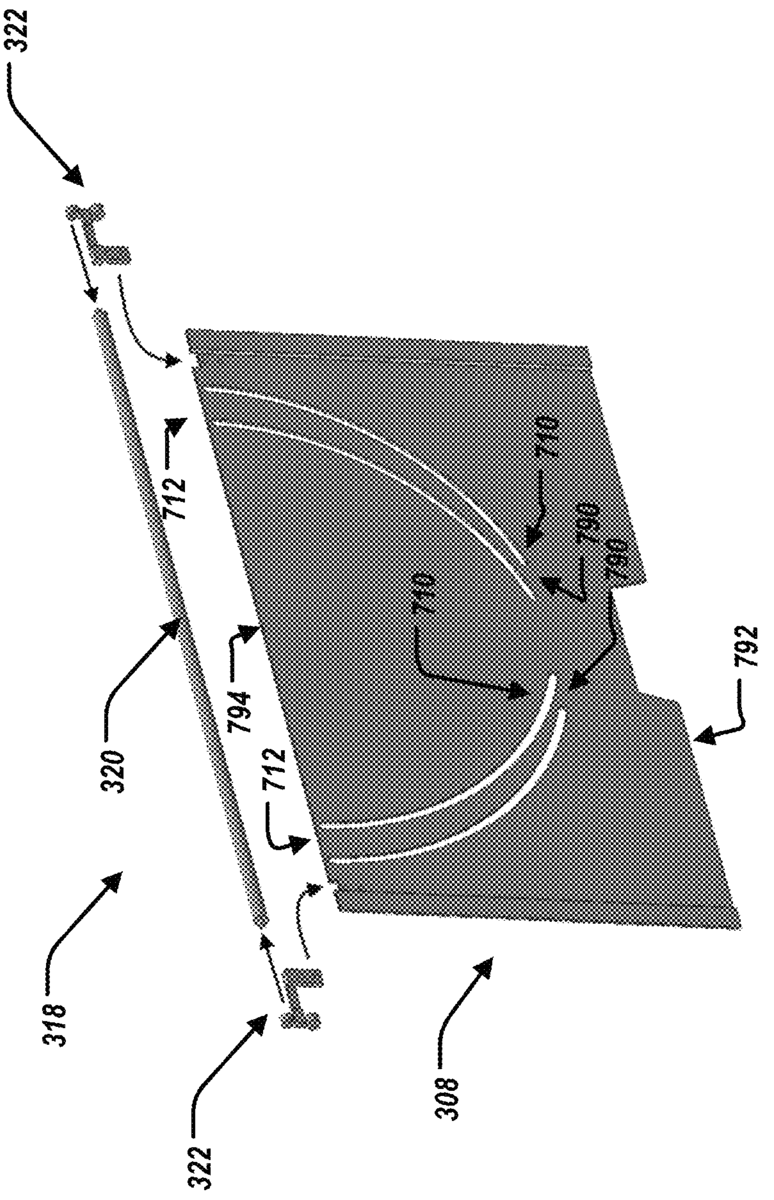
Figure 7D:
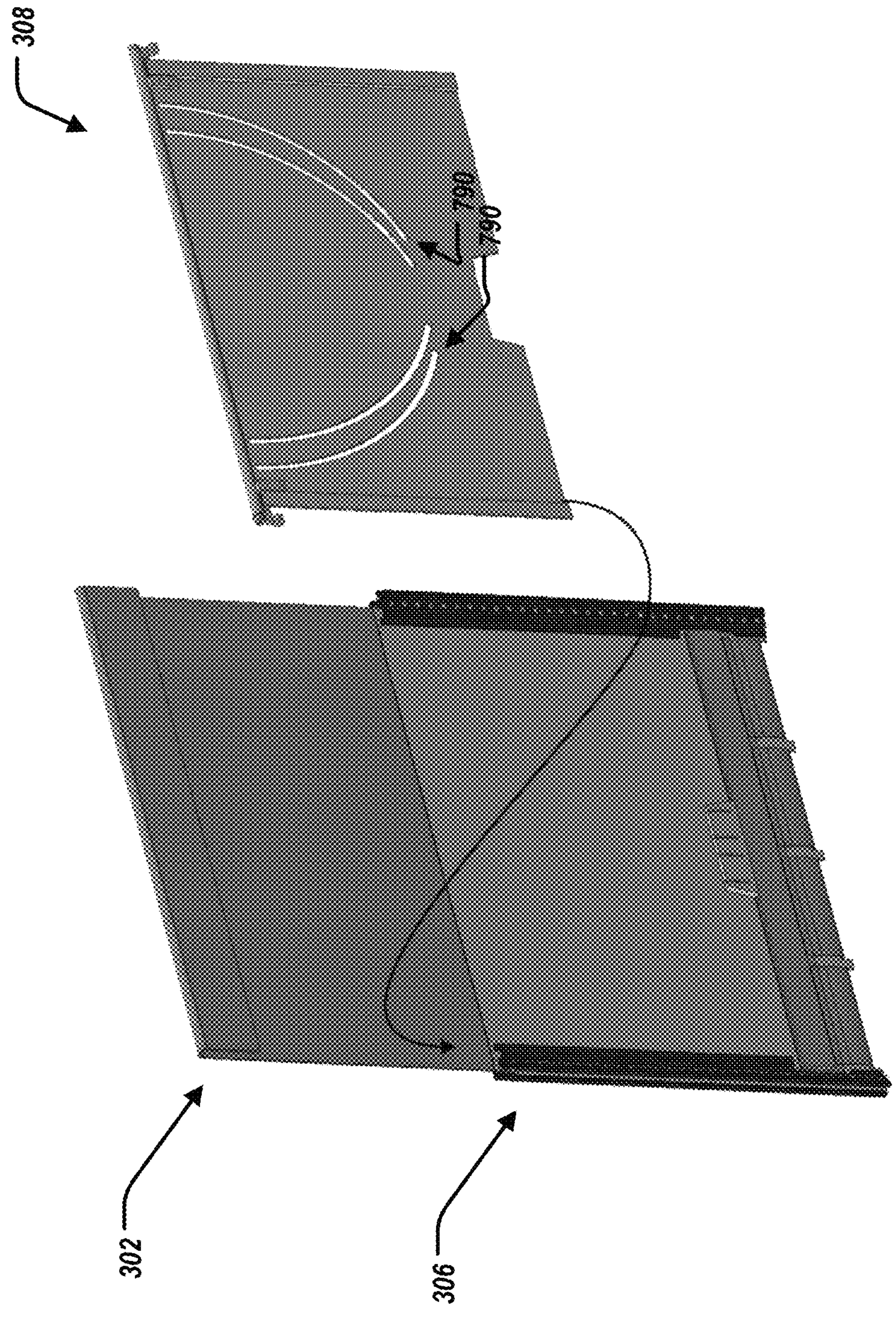

Referring to FIGS. 7B and 7D, the midframe 306 is coupled to the static portion 702 of the display panel 302. In some examples, the static portion 702 of the display panel 302 is bonded to the midframe 306. For example, the static portion 702 of the display panel 302 is glued to the midframe 306. The midframe 306 is static. Specifically, the midframe 306 is static with respect to the other components of the display unit 206 during the rolling/unrolling process.

Referring to FIG. 7C, the roller brackets 322 can be inserted into the roller 320 such that the roller assembly 318 is coupled to the sync plate 308 at the first side 704 of the sync plate 308.

Figure 7E:
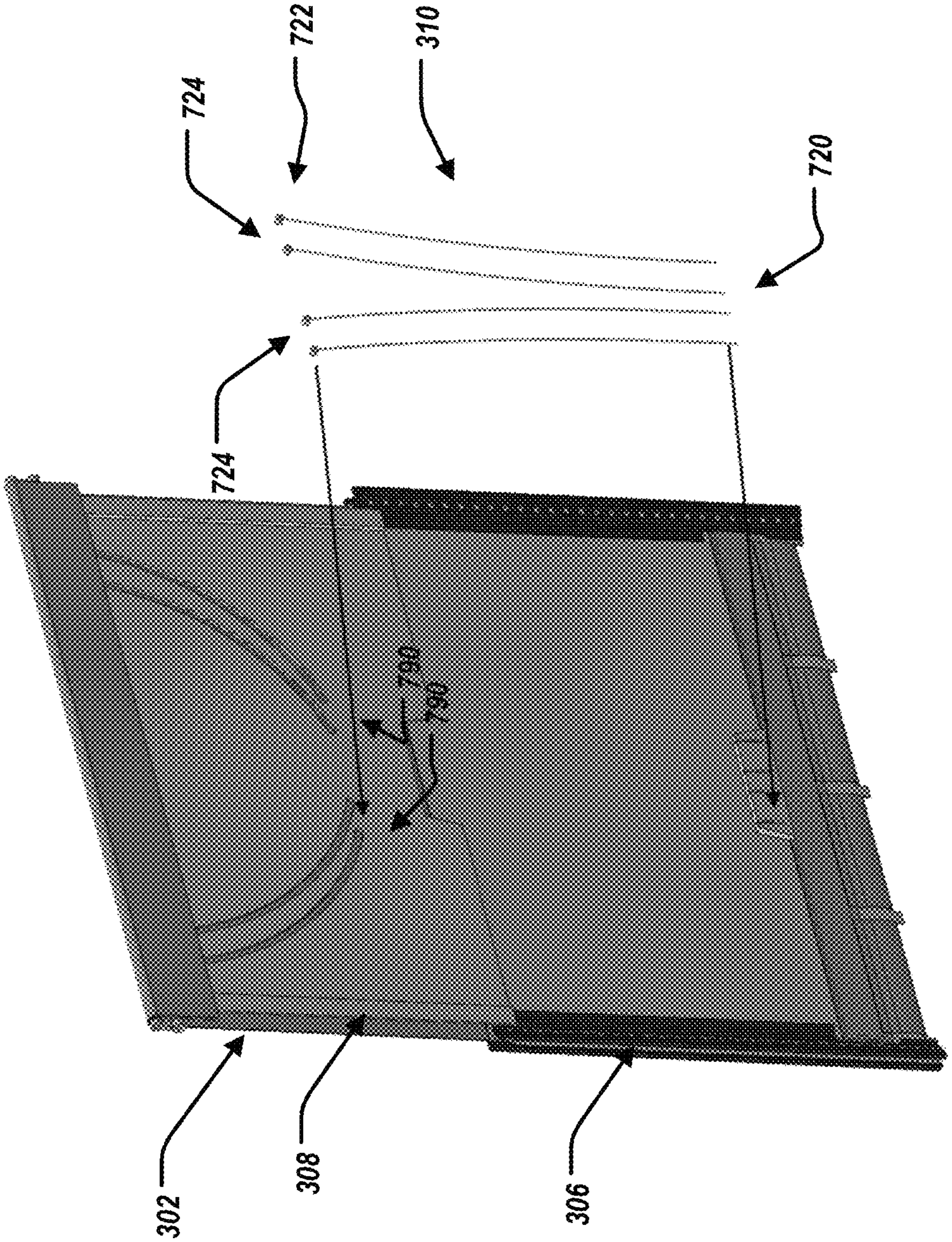
Figure 13:
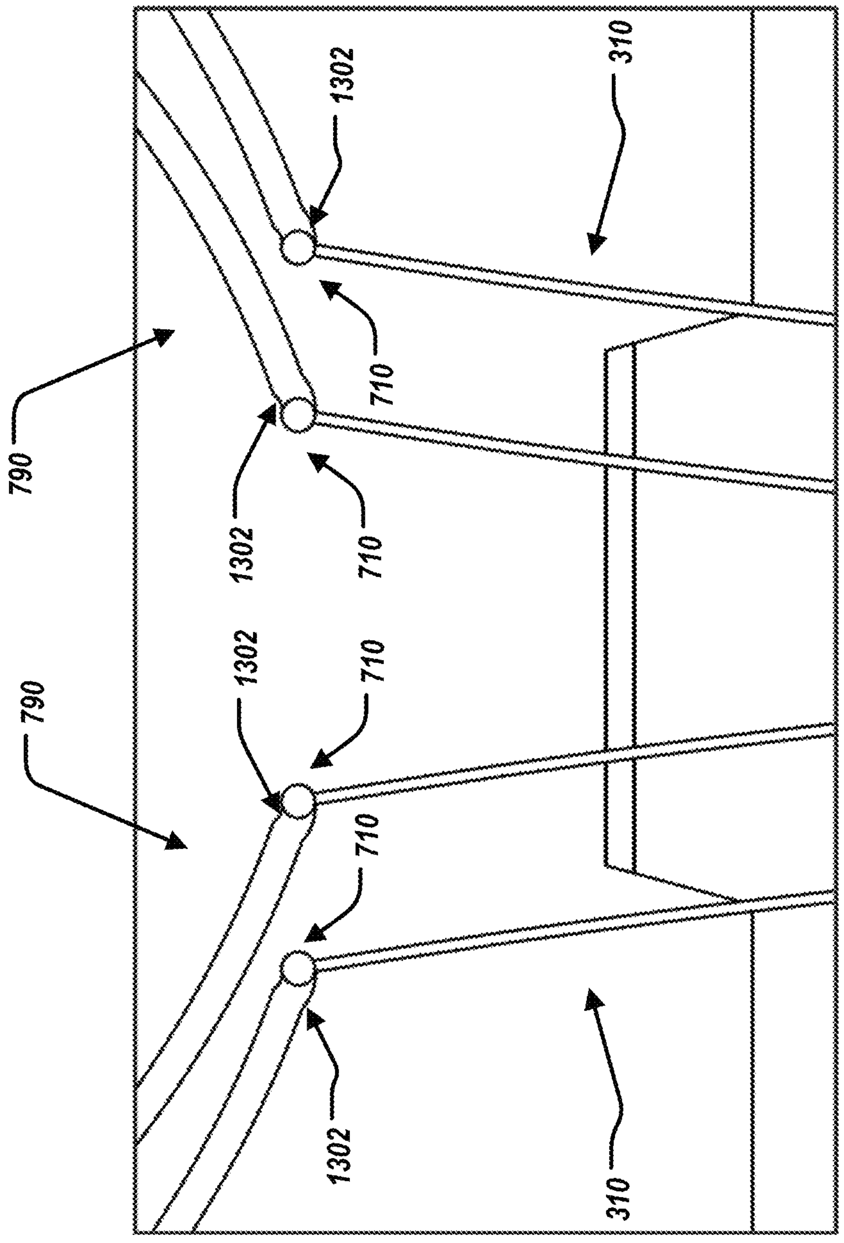
FIG. 13 illustrates counterweight springs when the display unit is in the first state.

Referring to FIGS. 7C-7E, the sync plate 308 is moveably coupled to the midframe 306. Specifically, the sync plate 308 is moveable coupled to the midframe 306 such that the display panel 302 is wrapped around the roller 320 and the tension bar 304 into the railing system 504 of the midframe 306. The sync plate 308 includes curved slots 790 extending from a first side 792 of the sync plate 308 to a second side 794 of the sync plate 308. Each of the curved slots 790 includes a respective first end 710 and a respective second end 712. Referring to FIG. 13, each of the curved slots 790 includes a detent 1302 at the respective first end 710.

Referring to FIG. 7C, the roller brackets 322 can be inserted into the roller 320 such that the roller assembly 318 is coupled to the sync plate 308 at the second side 794 of the sync plate 308.

Figure 7F:
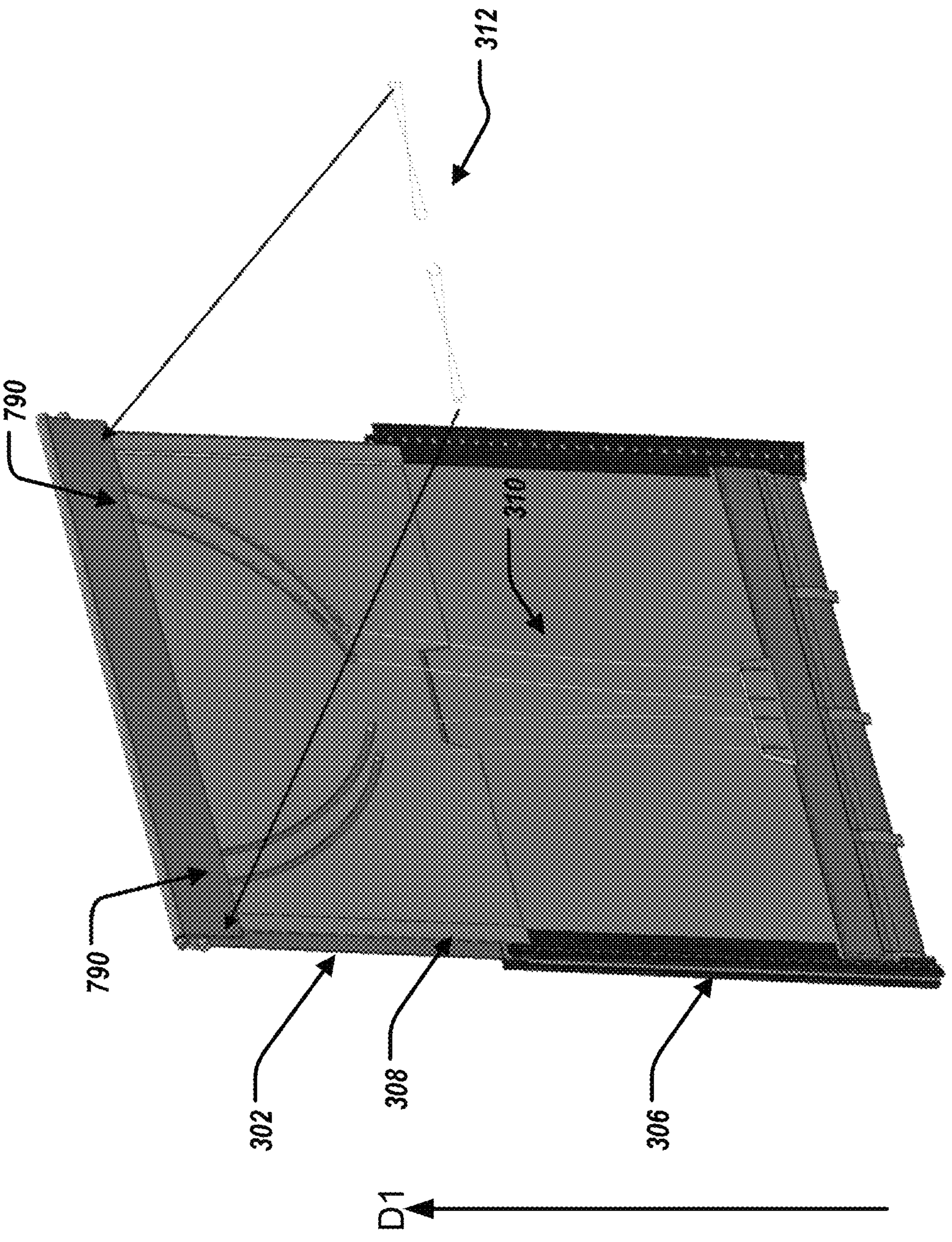

Referring to FIGS. 7E and 7F, the counterweight springs 310 include a first end 720 and a second end 722. The second end 722 of each of the counterweight springs 310 includes a protrusion 724. The counterweight springs 310 are coupled between the midframe 306 and the sync plate 308. Specifically, the counterweight springs 310 are coupled between the midframe 306 and the sync plate 308 such that the protrusions 724 of the second ends 722 of each of the counterweight springs 310 are movably coupled within a respective curved slot 790 of the sync plate 308. That is, the counterweight springs 310 are coupled to the midframe 306 and the sync plate 308.

The counterweight springs 310 provide a constant force along the direction D1 to the sync plate 308 which reduces a lifting force needed to extend the display panel 302, as described further herein. The counterweight springs 310 can include a "straight" metal rod that is bent creating the torsion force.

Figure 7G:
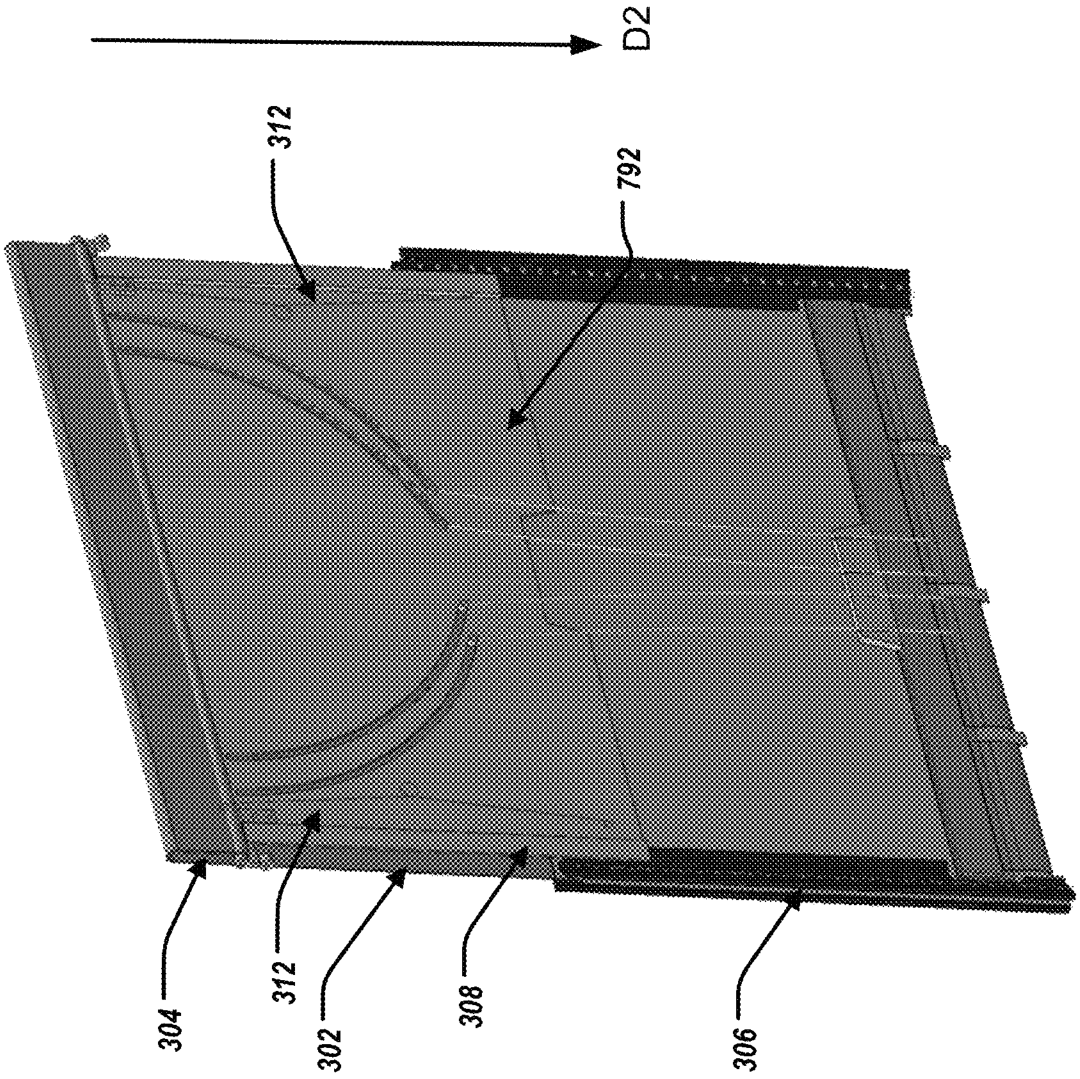
Figure 7H:
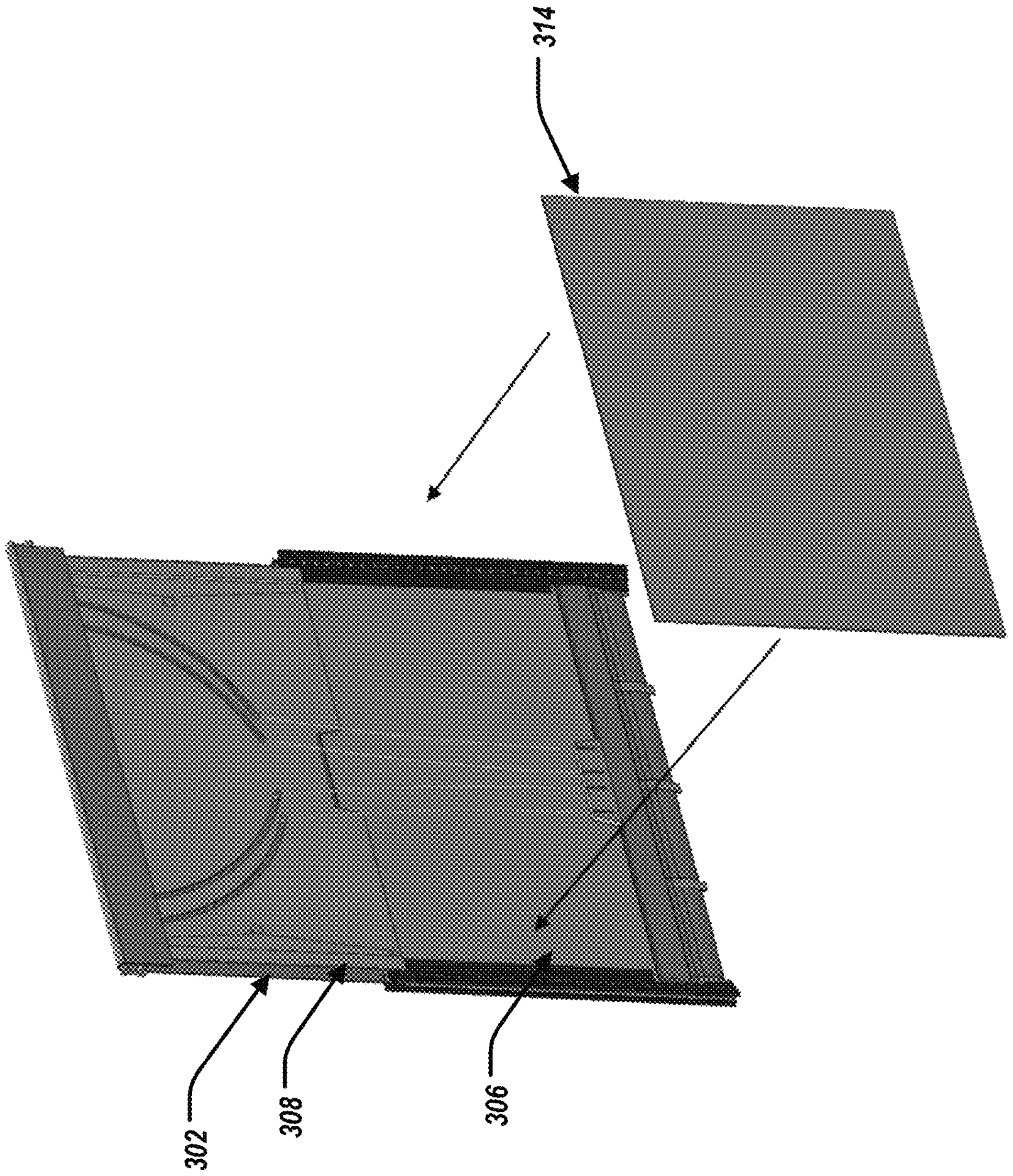

Referring to FIGS. 7G and 7H, the torsion springs 312 are coupled between the tension bar 304 and the second side 792 of the sync plate 308. That is, the torsion springs 312 are coupled to the tension bar 304 and to the second side 792 of the sync plate 308. The torsion springs 312 apply a contracting force between the tension bar 304 and the sync plate 308 to maintain the display panel 302 in tension through the full range of motion of the display panel 302 from a non-extended state to an extended state, described further herein. That is, the torsion springs 312 provide uniform tension on the display panel 302 through the unrolling/rolling process.

Figure 7I:
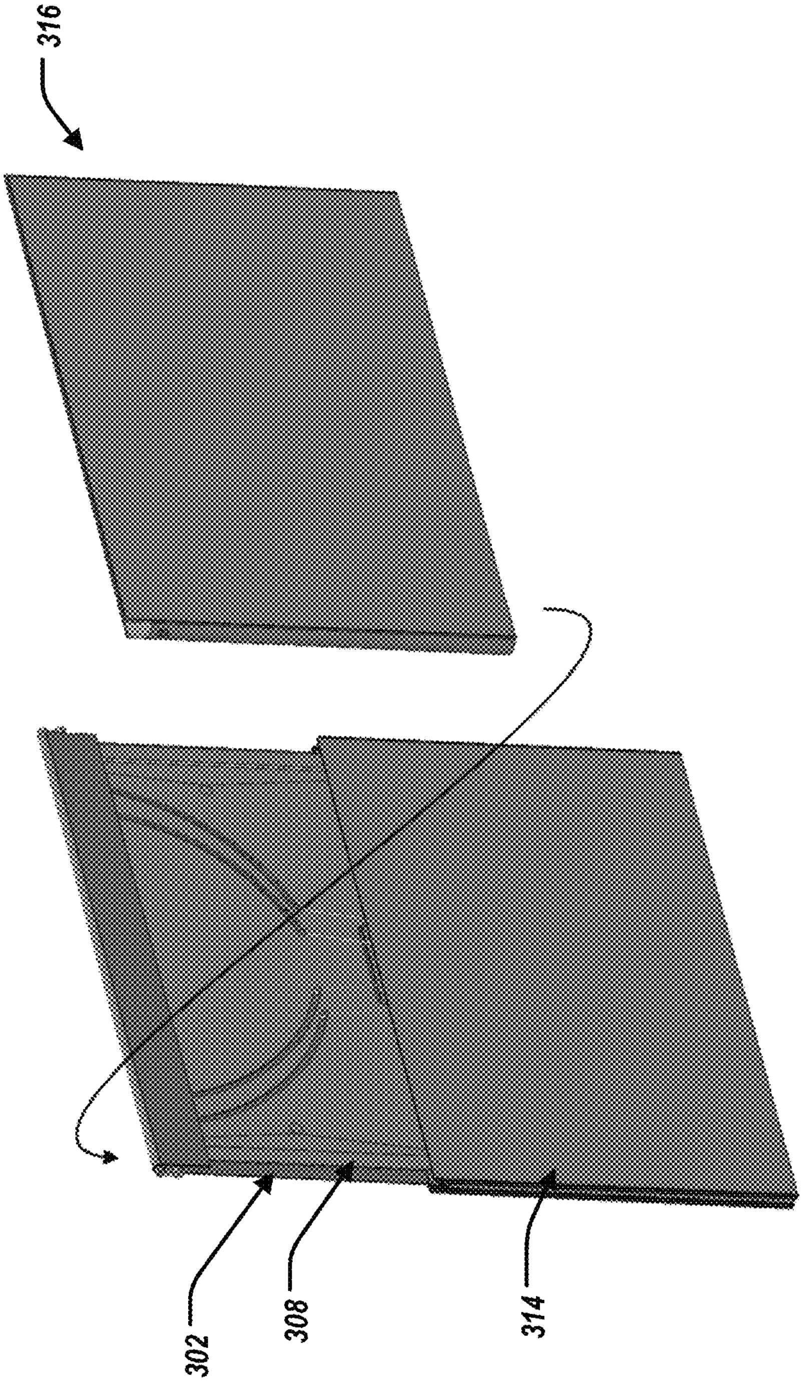

Referring to FIGS. 7H and 7I, the inner cover 314 is coupled to the midframe 306. The inner cover 314 is static. Specifically, the inner cover 314 is static with respect to the other components of the display unit 206 during the rolling/unrolling process.

Figure 7J:
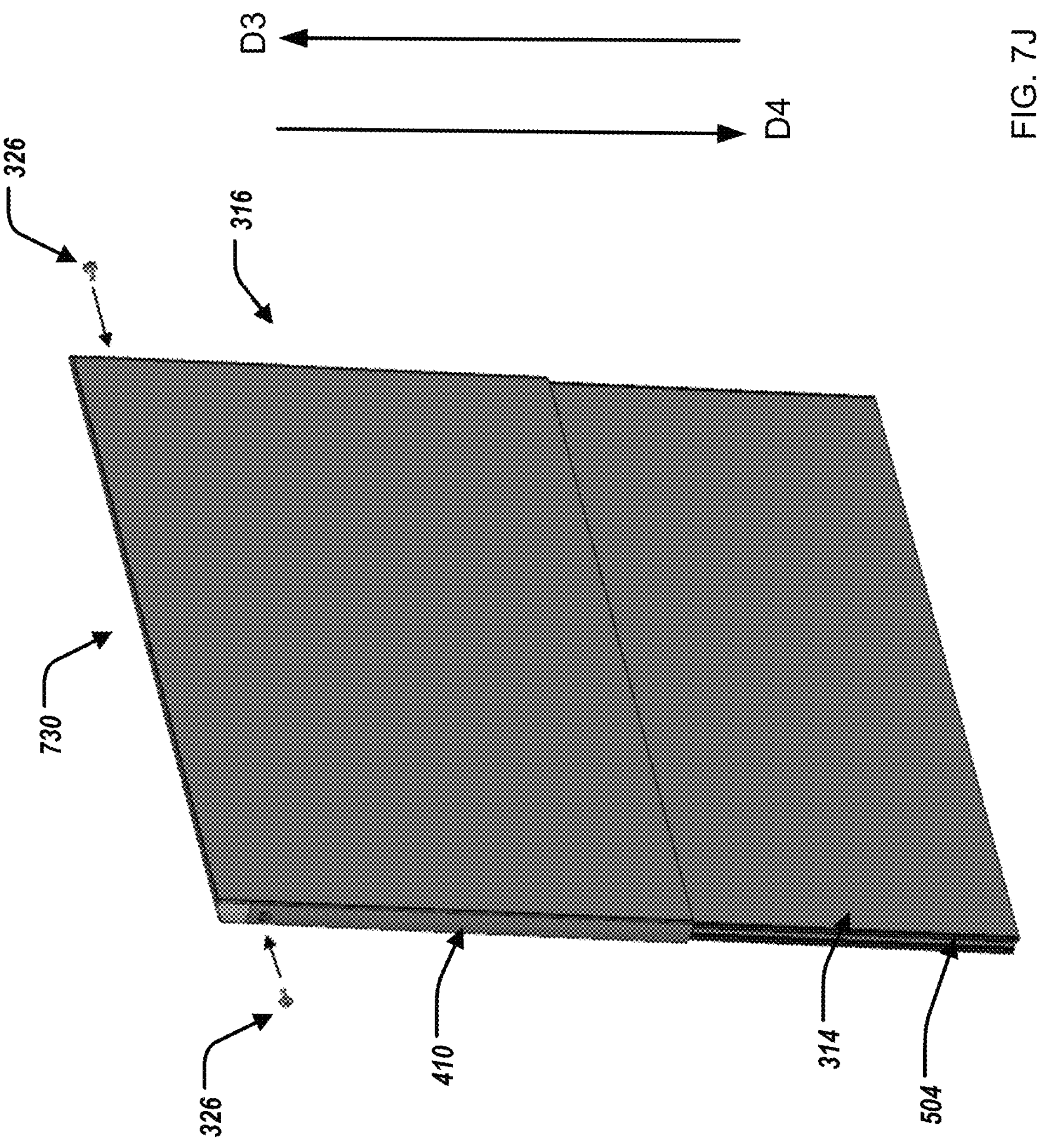
Figure 7K:
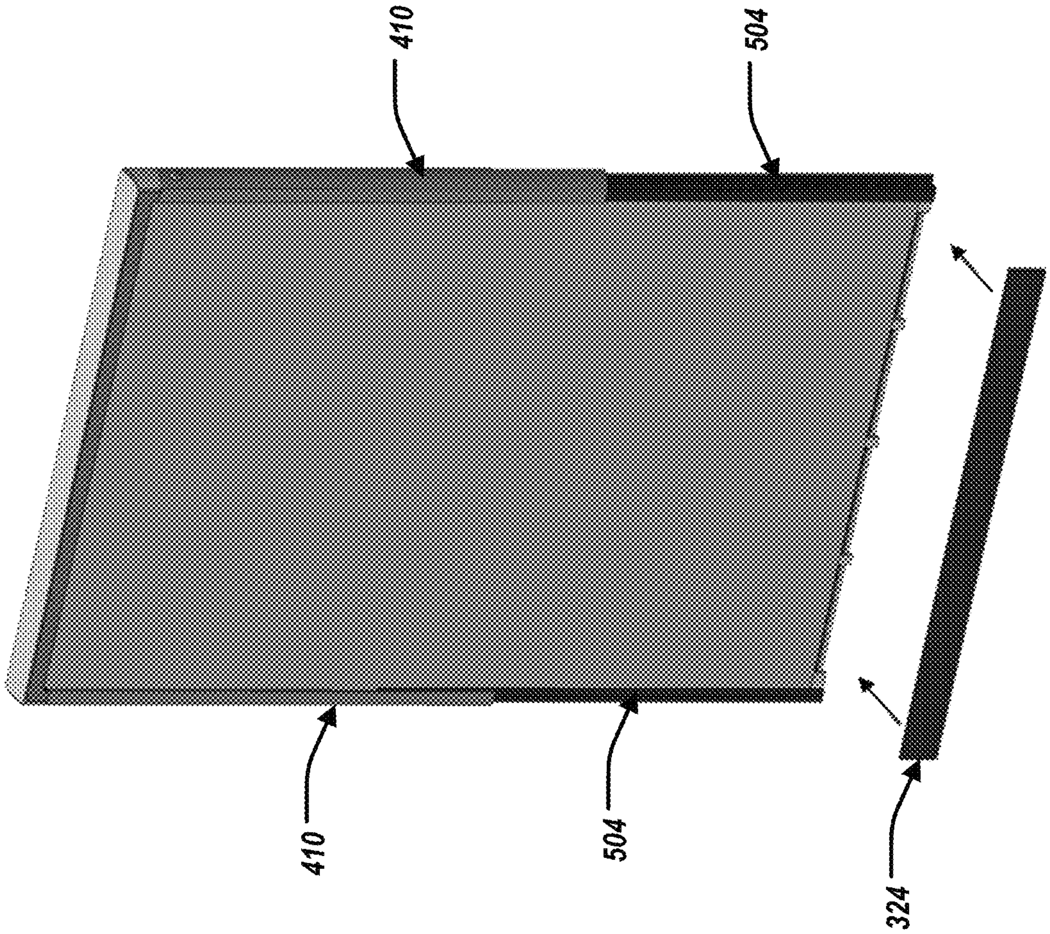

Referring to FIGS. 7I, 7J, and 7K, the outer cover 316 is coupled to the midframe 306. Specifically, the moving rails 410 of the outer cover 316 are moveably coupled to the railing system 504 of the midframe 306. In other words, the moving rails 410 of the outer cover 316 are moveably coupled to the railing system 504 of the midframe 306 such that the outer cover 316 is able to be translated along the direction D3 (when the display panel 302 is being extended) and along the direction D4 (when the display panel 302 is being retracted).

Furthermore, when the outer cover 316 is coupled to the midframe 306, the magnetic assemblies 412 (shown in FIG. 4) of each of the moving rails 410 of the outer cover 316 are in electromagnetic communication with the coils of the respective coil rails 602 (shown in FIG. 6) of the railing system 504 of the midframe 306. When the magnetic assemblies 412 (shown in FIG. 4) of each of the moving rails 410 of the outer cover 316 are in electromagnetic communication with the coils of the respective coil rails 602 (shown in FIG. 6) of the railing system 504 of the midframe 306, a current can be applied to the coil rails 602 to provide translation of the outer cover 316, described further herein.

Referring to FIGS. 4, 7C and 7J, the roller 318 is rotatably coupled between the first side 420 and the second side 422 of the outer cover 316 at a first end 730 of the outer cover 316. That is, the screws 326 couple the roller 318 between the first side 420 and the second side 422 of the outer cover 316 such that the roller 318 can rotate, and thus, facilitate rolling and unrolling of the display panel 302 when transitioned between the extended and non-extended states, described further herein.

Referring to FIG. 7K, the bottom bezel 324 is coupled to the midframe 306.

Figure 8:
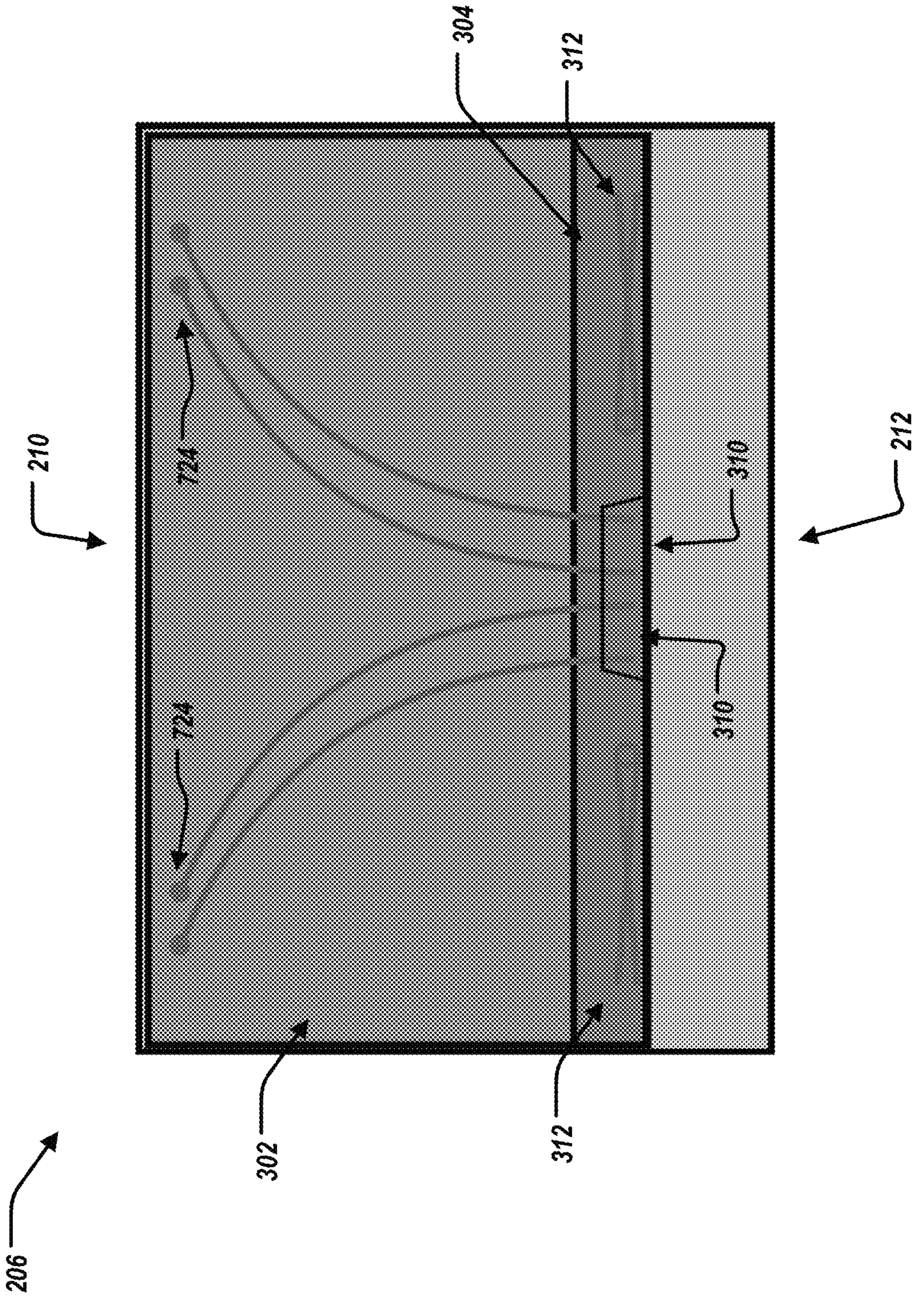
FIG. 8 illustrates the display unit in the first state.

FIG. 8 illustrates the display unit 206 in a first state. Specifically, when the display unit 206 and the display panel 302 are in the first state, the display panel 302 is in the non-extended state. Specifically, when the display unit 206 is in the first state, the torsion springs 312 are in an unflexed state to place the tension bar 304 proximate to the second end 212 of the display unit 206. Further, when the display unit 206 is in the first state, the protrusions 724 of the counterweight springs 310 are at respective first ends 710 of the curved slots 790 (shown in FIG. 7C). To that end, when i) the torsion springs 312 are in an unflexed state to place the tension bar 304 proximate to the second end 212 of the display unit 206 and ii) the protrusions 724 of the counterweight springs 310 are at respective first ends 710 of the curved slots 790, the display panel 302 is rolled over the roller 318 and the retractable portion 704 (shown in FIG. 7A) is positioned between the static portion 702 (shown in FIG. 7A) of the display panel 302 and the inner cover 314 to hide the retractable portion 704 within the display unit 206. That is, the retractable portion 704 of the display panel 302 is hidden from view (e.g., by a user), as shown in FIG. 2. That is, the retractable portion 704 is positioned within the display unit 206, and in particular, between the static portion 702 of the display panel 302 and the inner cover 314. In other words, the display panel 302 is rolled over the roller 318 such that the retractable portion 704 is retracted within the display panel 302.

Furthermore, the torsion springs 312 place the tension bar 304 proximate to the second end 212 of the display unit 206 such that the torsion springs 312 apply a force to the display panel 302 to provide uniform tension on the display panel 302 such that the static portion 702 of the display panel 302 is taut. That is, the torsion springs 312, in the first state, apply a force to the display panel 302 to maintain the tension on the display panel 302 and to compensate for any variations in component tolerances of the display panel 302. Moreover, the static portion 702 of the display panel 302 is always exposed, including during the first state of the display unit 206.

Moreover, referring to FIGS. 7E, 8 and 13, the protrusions 724 of the counterweight springs 310 are positioned within the detents 1302 of the curved slots 790 when the display unit 206 is in the first state. The detents 1302 facilitate maintaining the desired positioning of the counterweight springs 310 when the display unit 206 is in the first state.

Figure 9:
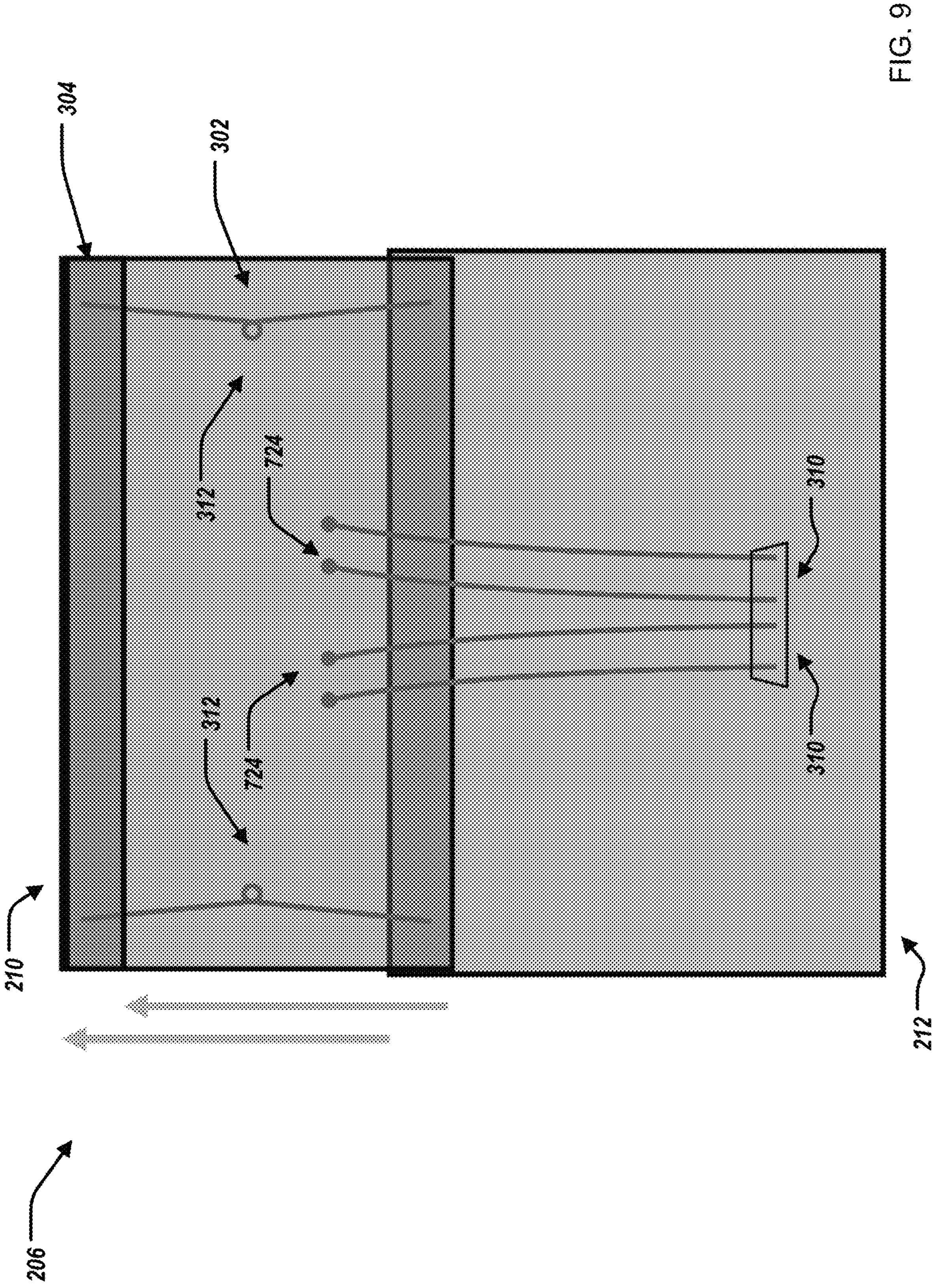
FIG. 9 illustrates the display unit in a second state.
Figure 10:
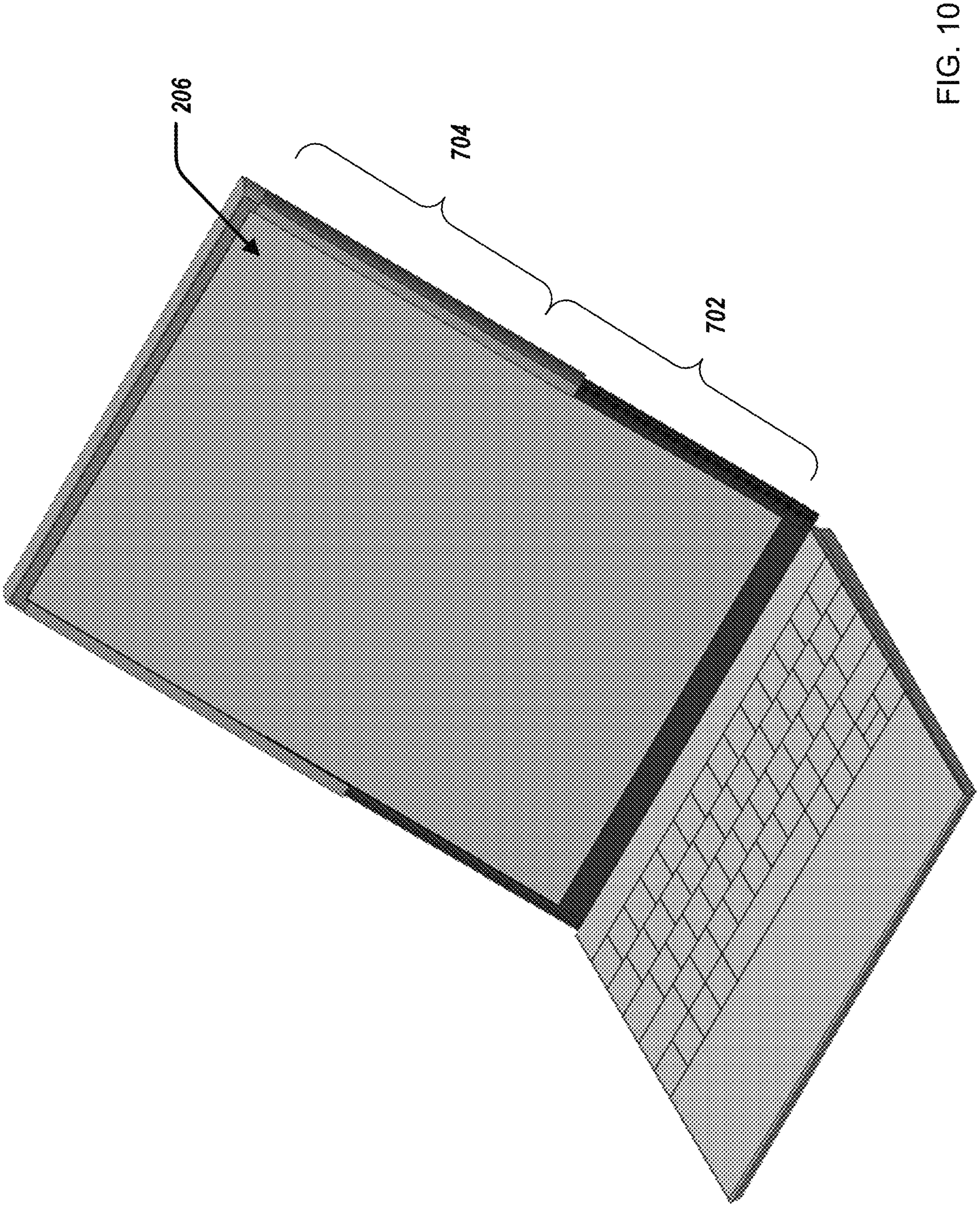
FIG. 10 illustrates a perspective view of the information handling system, in a second state.

FIG. 9 illustrates the display unit 206 in a second state. Specifically, when the display unit 206 and the display panel 302 are in the second state, the display panel 302 is in an extended state. Specifically, when the display unit 206 is in the second state, the torsion springs 312 are in a flexed state to place the tension bar 304 proximate to the first end 210 of the display unit 206. Further, when the display unit 206 is in the second state, the protrusions 724 of the counterweight springs 310 are at respective second ends 712 of the curved slots 790 (shown in FIG. 7C). To that end, when i) the torsion springs 312 are in a flexed state to place the tension bar 304 proximate to the first end 210 of the display unit 206 and ii) the protrusions 724 of the counterweight springs 310 are at respective second ends 712 of the curved slots 790, the display panel 302 is rolled up from the roller 318 (shown in FIGS. 3, 7C), and the retractable portion 704 (shown in FIG. 7A) is exposed. That is, the retractable portion 704 of the display panel 302 is viewable (e.g., by a user), as shown in FIG. 10. In other words, the retractable portion 704 is rolled up from being retracted/hidden within the display unit 206 to be in the extended view.

Furthermore, the counterweight springs 310 provide a constant force along direction D1 (shown in FIG. 7F) to the sync plate 308 to facilitate placing the display unit 206 in the second state. That is, the counterweight springs 310 reduce the required lifting force to extend the display panel 302 from the first state to the second state. For example, the counterweight springs 310 can provide approximately 18 Newtons (N) of force to transfer the display unit 206 from the first state to the second state such that a user or a drive assembly (such as the coil rails 602 and the magnetic assemblies 412, described further herein) only needs to provide approximately 2N of force. That is, the counterweight springs 310 create a counterbalance to the weight of the display unit 206.

Moreover, by the torsion springs 312 being flexed, the torsion springs apply the contracting force on the tension bar 304 on the display panel 302 to provide uniform tension on the display panel 302 such that the static portion 702 and the retractable portion 704 of the display panel 302 are taut. Moreover, the static portion 702 of the display panel 302 is always exposed, including during the second state of the display unit 206. Further, the retractable portion 704 of the display panel 302 is only fully exposed in the second state of the display unit 206.

Figure 11:
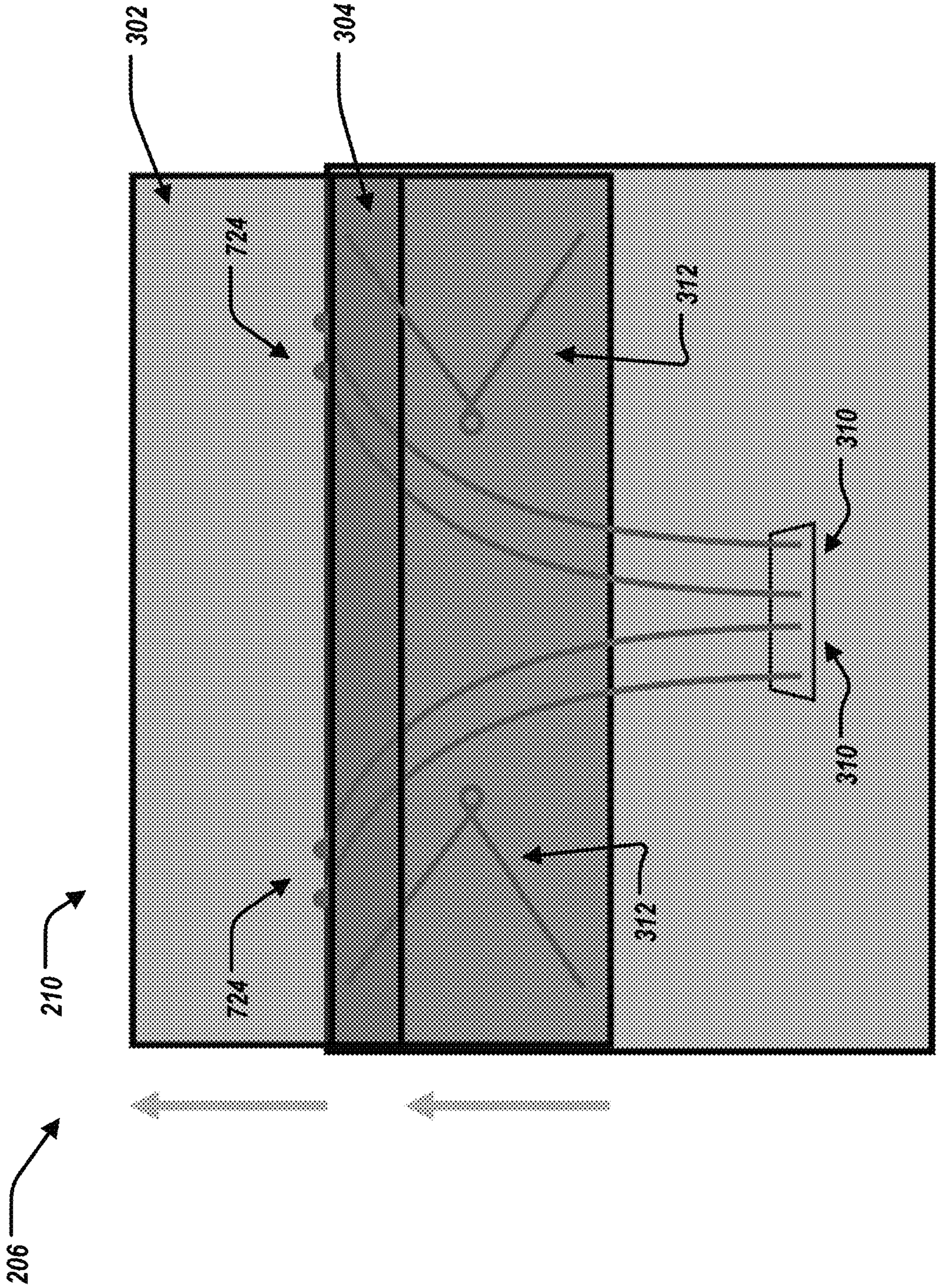
FIG. 11 illustrates the display unit in a third state.

FIG. 11 illustrates the display unit 206 in a third state. Specifically, when the display unit 206 and the display panel 302 are in the third state, the display panel 302 is in a partial extended/exposed state. Specifically, when the display unit 206 is in the third state, the torsion springs 312 are in a partially flexed state to place the tension bar 304 between the first end 210 and the second end 212 of the display unit 206. Further, when the display unit 206 is in the third state, the protrusions 724 of the counterweight springs 310 are between respective first ends 710 and second ends 712 of the curved slots 790 (shown in FIG. 7C). To that end, when i) the torsion springs 312 are in a partially flexed state to place the tension bar 304 between the first end 210 and the second end 212 of the display unit 206 and ii) the protrusions 724 of the counterweight springs 310 are between respective first ends 710 and second ends 712 of the curved slots 790, the display panel 302 is partially rolled up from the roller 318 (shown in FIGS. 3, 7C), and the retractable portion 704 (shown in FIG. 7A) is partially exposed. That is, a portion of the retractable portion 704 of the display panel 302 is viewable (e.g., by a user). In other words, the retractable portion 704 is partially rolled up from being retracted/hidden within the display unit 206 to be in the partially extended view.

Furthermore, the counterweight springs 310 provide a constant force along direction D1 (shown in FIG. 7F) to the sync plate 308 to facilitate placing the display unit 206 in the third state. That is, the counterweight springs 310 reduce the required lifting force to extend the display panel 302 from the first state to the third state and ultimately to the second state.

Moreover, by the torsion springs 312 being partially flexed, the torsion springs 312 apply the contracting force on the tension bar 304 on the display panel 302 to provide uniform tension on the display panel 302 such that the static portion 702 and the retractable portion 704 of the display panel 302 are taut. Moreover, the static portion 702 of the display panel 302 is always exposed, including during the third state of the display unit 206. Further, the retractable portion 704 of the display panel 302 is partially exposed in the third state of the display unit 206.

The display unit 206 can transfer from the first state to the third state to the second state; and from the second state to the third state to the first state.

Figure 12:
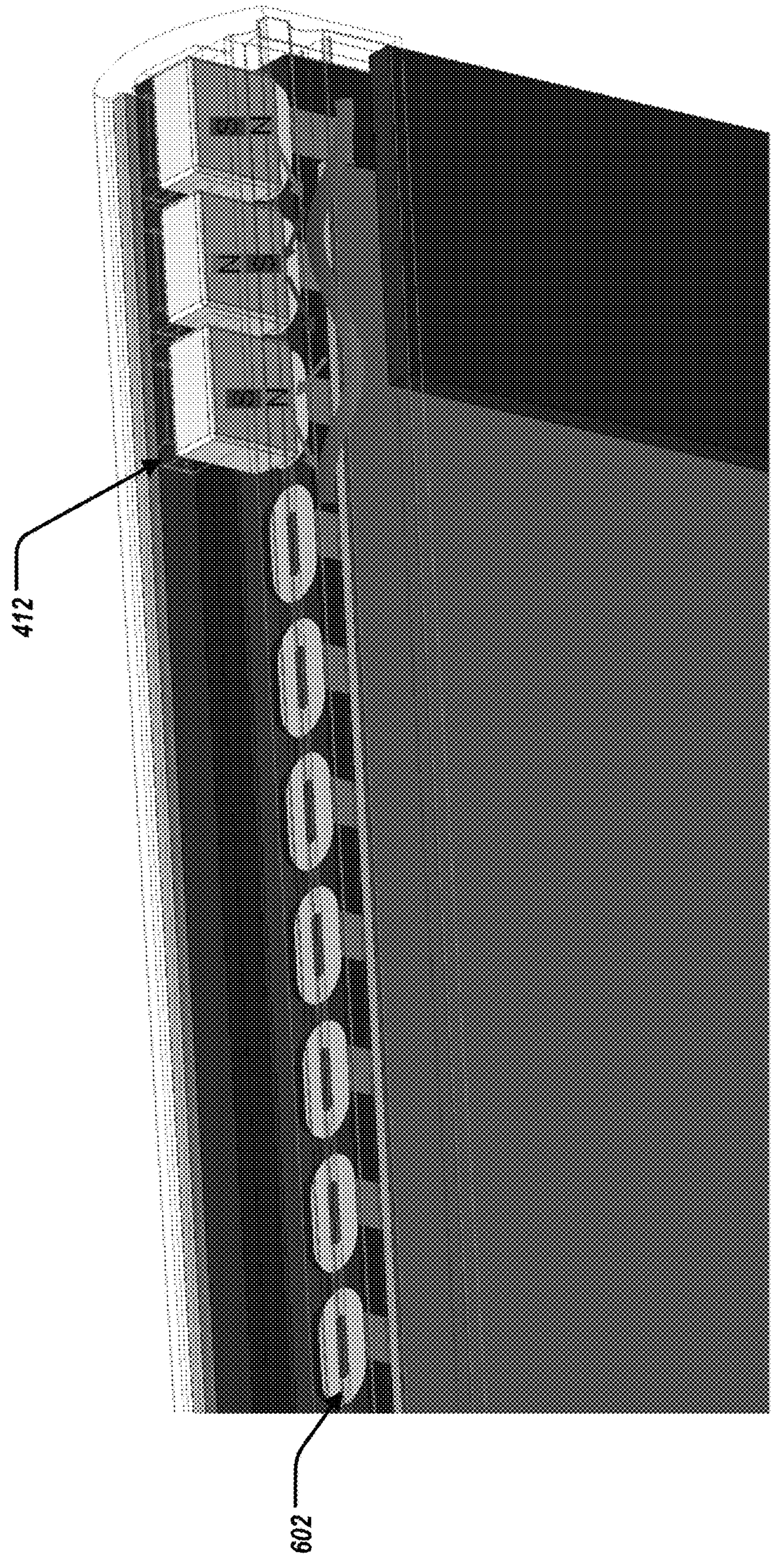
FIG. 12 illustrates the railing system of the midframe and the magnetic assemblies of the outer cover.

In some further examples, a power source (not shown) can be coupled to the display unit 206 to provide a power signal (current) to the coils of the coil rails 602 (shown in FIG. 6) of the railing system 504 of the midframe 306 to transition the display unit 206 between the states (between the first, second, and third states). As shown in FIG. 12, the magnetic assemblies 412 (or magnets 412) can be of alternating polarity and can include any number of magnets to provide propulsion torque/force. The coils 602 are excited with an AC current (from a power source) such that each individual coil adjacent to the magnets 412 will work to pull or push the adjacent magnet 412, depending on polarity, in a specified direction.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A display unit, including:

a display panel including a static portion and a retractable portion;

a tension bar coupled to the retractable portion of the display panel;

a midframe coupled to the static portion of the display panel;

a sync plate including a plurality of curved slots extending from a first side of the sync plate to a second side of the sync plate, each of the curved slots including a respective first end and a respective second end, the sync plate moveably coupled to the midframe;

counterweight springs each including a first end and a second end, the second ends each including a protrusion, the counterweight springs coupled between the midframe and the sync plate such that the protrusions of the second ends of each of the counterweight springs are movably coupled within a respective curved slot of the sync plate;

torsion springs coupled between the tension bar and the second side of the sync plate;

an inner cover coupled to the midframe;

an outer cover coupled to the midframe; and a roller coupled to the sync plate and rotatably coupled between the first and the second sides of the outer cover at a first end of the outer cover, wherein when the display panel is in a first state, i) the torsion springs are in an unflexed state to place the tension bar proximate to a second end of the display unit and ii) the protrusions of the counterweight springs are at respective first ends of the curved slots such that the display panel is rolled over the roller and the retractable portion of the display panel is positioned between the static portion of the display panel and the inner cover to hide the retractable portion of the display unit within the display unit, wherein when the display panel is in a second state, i) the torsion springs are in a flexed state to place the tension bar proximate to a first end of the display unit opposite the second end of the display unit and ii) the protrusions of the counterweight springs are at respective second ends of the curved slots such that the display panel is rolled up from the roller and the retractable portion of the display panel is exposed.

2. The display unit of claim 1, wherein the midframe includes a first side and a second side, the midframe including a railing system positioned at the first and the second sides of the midframe.

3. The display unit of claim 2, wherein the outer cover includes a first side and a second side, the outer cover including moving rails positioned at the first and the second sides of the outer frame.

4. The display unit of claim 3, wherein the moving rails of the outer cover are moveably coupled to the railing system of the midframe.

5. The display unit of claim 4, wherein the railing system of the midframe includes coil rails at each of the first and the second sides of the midframe, the coil rails including respective coils.

6. The display unit of claim 5, wherein the moving rails of the outer cover at each side of the outer cover include a respective magnetic assembly in electromagnetic communication with the respective coils of the coil rails of the railing system of the midframe.

7. The display unit of claim 6, further including a power source to provide a current to the respective coils of the coil rails of the railing system of the midframe to transition the display panel between the first state and the second state.

8. The display unit of claim 1, wherein when the display panel is in a third state, i) the torsion springs are in a partially flexed state to place the tension bar between the first end and the second end of the display unit and ii) the protrusions of the counterweight springs are between the first ends and the second ends of the curved slots such that the display panel is partially rolled up from the roller and the retractable portion of the display panel is partially exposed.

9. The display unit of claim 1, wherein a force of the counterweight springs counterbalance a weight of the display unit.

10. The display unit of claim 1, wherein the static portion of the display panel is always exposed.

11. The display unit of claim 1, wherein the midframe is static.

12. The display unit of claim 1, wherein the inner cover is static.

13. An information handling system, including:

a display unit, including:

a display panel including a static portion and a retractable portion;

a tension bar coupled to the retractable portion of the display panel;

a midframe coupled to the static portion of the display panel;

a sync plate including a plurality of curved slots extending from a first side of the sync plate to a second side of the sync plate, each of the curved slots including a respective first end and a respective second end, the sync plate moveably coupled to the midframe;

counterweight springs each including a first end and a second end, the second ends each including a protrusion, the counterweight springs coupled between the midframe and the sync plate such that the protrusions of the second ends of each of the counterweight springs are movably coupled within a respective curved slot of the sync plate;

torsion springs coupled between the tension bar and the second side of the sync plate;

an inner cover coupled to the midframe;

an outer cover coupled to the midframe; and a roller coupled to the sync plate and rotatably coupled between the first and the second sides of the outer cover at a first end of the outer cover, wherein when the display panel is in a first state, i) the torsion springs are in an unflexed state to place the tension bar proximate to a second end of the display unit and ii) the protrusions of the counterweight springs are at respective first ends of the curved slots such that the display panel is rolled over the roller and the retractable portion of the display panel is positioned between the static portion of the display panel and the inner cover to hide the retractable portion of the display unit within the display unit, wherein when the display panel is in a second state, i) the torsion springs are in a flexed state to place the tension bar proximate to a first end of the display unit opposite the second end of the display unit and ii) the protrusions of the counterweight springs are at respective second ends of the curved slots such that the display panel is rolled up from the roller and the retractable portion of the display panel is exposed.

14. The information handling system of claim 13, wherein the midframe includes a first side and a second side, the midframe including a railing system positioned at the first and the second sides of the midframe.

15. The information handling system of claim 14, wherein the outer cover includes a first side and a second side, the outer cover including moving rails positioned at the first and the second sides of the outer frame.

16. The information handling system of claim 15, wherein the moving rails of the outer cover are moveably coupled to the railing system of the midframe.

17. The information handling system of claim 16, wherein the railing system of the midframe includes coil rails at each of the first and the second sides of the midframe, the coil rails including respective coils.

18. The information handling system of claim 17, wherein the moving rails of the outer cover at each side of the outer cover include a respective magnetic assembly in electromagnetic communication with the respective coils of the coil rails of the railing system of the midframe.

19. The information handling system of claim 18, further including a power source to provide a current to the respective coils of the coil rails of the railing system of the midframe to transition the display panel between the first state and the second state.

20. The information handling system of claim 13, wherein when the display panel is in a third state, i) the torsion springs are in a partially flexed state to place the tension bar between the first end and the second end of the display unit and ii) the protrusions of the counterweight springs are between the first ends and the second ends of the curved slots such that the display panel is partially rolled up from the roller and the retractable portion of the display panel is partially exposed.

* * * * *